(12) United States Patent
Kuhn

(10) Patent No.: US 6,954,871 B2
(45) Date of Patent: Oct. 11, 2005

(54) METHOD OF MATCHING DIFFERENT SIGNAL PROPAGATION TIMES BETWEEN A CONTROLLER AND AT LEAST TWO PROCESSING UNITS, AND A COMPUTER SYSTEM

(75) Inventor: Justus Kuhn, München (DE)

(73) Assignee: Infineon Technologies AG, Munich (DE)

(*) Notice: Subject to any disclaimer, the term of this patent is extended or adjusted under 35 U.S.C. 154(b) by 574 days.

(21) Appl. No.: 10/147,545

(22) Filed: May 16, 2002

(65) Prior Publication Data

US 2002/0174313 A1 Nov. 21, 2002

(30) Foreign Application Priority Data

May 16, 2001 (DE) ........................................ 101 23 769

(51) Int. Cl.$^7$ ................................................. G06F 1/04
(52) U.S. Cl. ...................................... 713/401; 713/503
(58) Field of Search ................................. 713/400, 401, 713/500, 503, 600

(56) References Cited

U.S. PATENT DOCUMENTS

| | | | | |
|---|---|---|---|---|
| 5,892,981 A | * | 4/1999 | Wiggers | 710/58 |
| 6,445,624 B1 | * | 9/2002 | Janzen et al. | 365/191 |
| 6,480,946 B1 | * | 11/2002 | Tomishima et al. | 711/167 |
| 6,658,523 B2 | * | 12/2003 | Janzen et al. | 711/105 |

FOREIGN PATENT DOCUMENTS

| DE | 4439126 C1 | 3/1996 |
|---|---|---|
| DE | 19625219 C1 | 10/1997 |

* cited by examiner

*Primary Examiner*—Dennis M. Butler
(74) *Attorney, Agent, or Firm*—Laurence A. Greenberg; Werner H. Stemer; Ralph E. Locher

(57) ABSTRACT

In a fast synchronously controlled computer system, data signals are called from various memory banks, and this can result in propagation times of different lengths for the data signals, depending on the physical distance from the controller. Therefore, the data signals from a memory bank closer to the controller enter the controller earlier than in the case of a further removed one. To cure this problem, the controller sends an additional read signal that is also transmitted bi-directionally, first to the furthest removed data buffer of an associated memory bank and then to the closer data buffers of the corresponding memory banks. As a result, a sum of signal propagation times of the read signal from the controller to the respective memory bank and that of the read data from the memory bank to the controller is always of the same length, irrespective of the position of the memory bank.

18 Claims, 3 Drawing Sheets

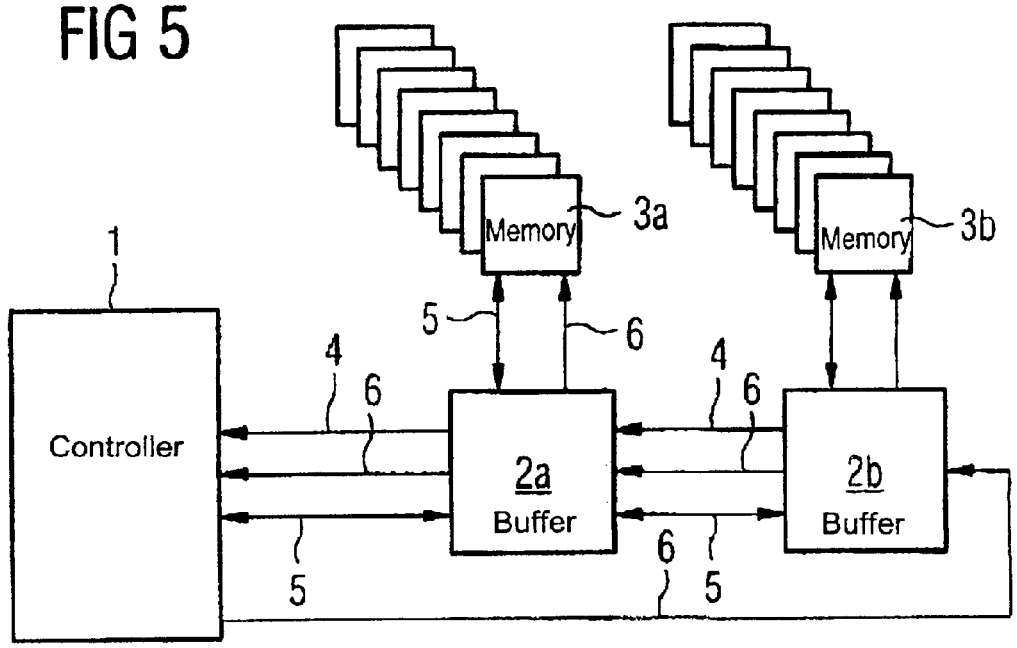
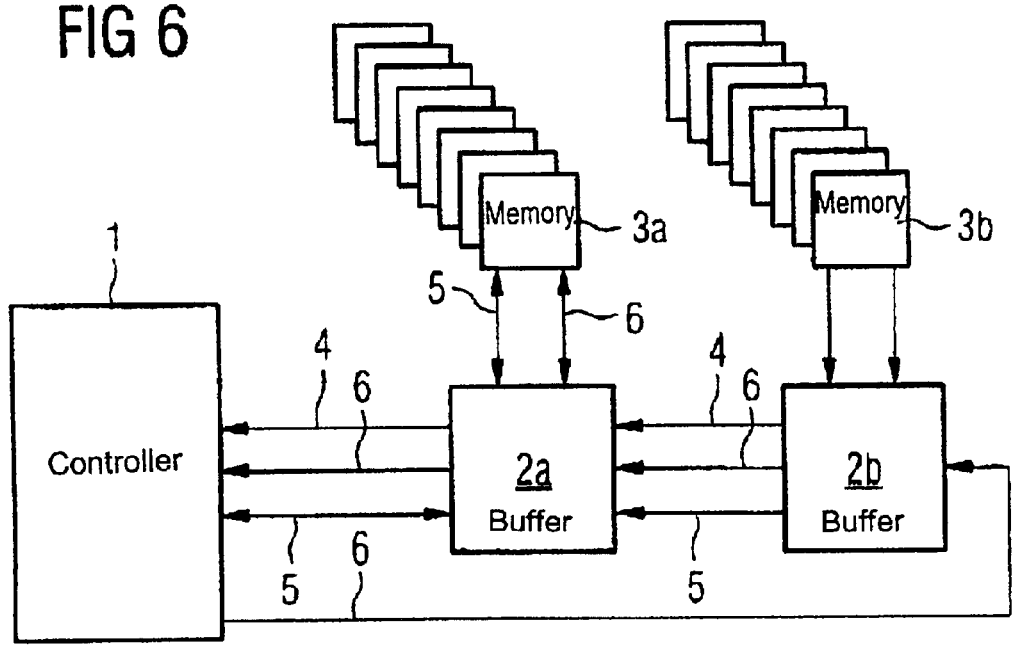

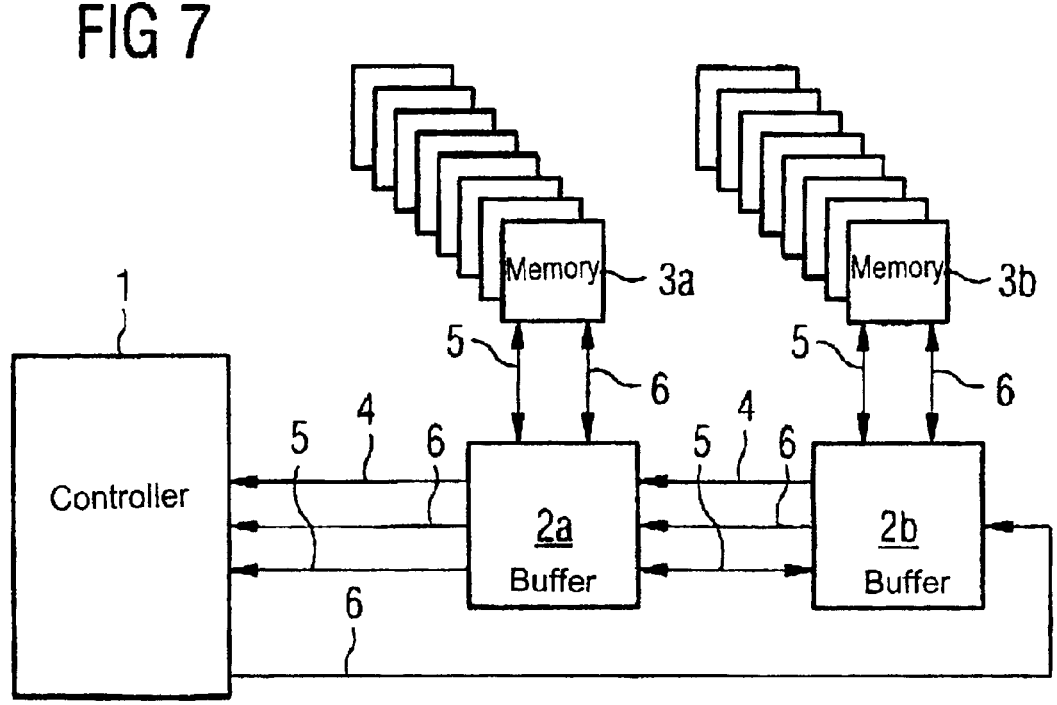

METHOD OF MATCHING DIFFERENT SIGNAL PROPAGATION TIMES BETWEEN A CONTROLLER AND AT LEAST TWO PROCESSING UNITS, AND A COMPUTER SYSTEM

BACKGROUND OF THE INVENTION

Field of the Invention

The invention is based on a method and, respectively, a computer system in which a controller is connected to at least two processing units, for example to two memory banks, via data lines of different lengths.

In a fast synchronously controlled computer system, in which a controller communicates, preferably bi-directionally, with a plurality of processing units disposed physically separately, via data lines of different lengths, the individual data signals can have propagation times of different lengths, on account of parasitic inductive and capacitive effects. The propagation time differences occur both in the direction of the processing unit and also conversely in the direction of the controller and can impair the processing of the data considerably. For example, after setting a common read command, the controller receives data from a memory bank placed closer at an earlier time than from a memory bank further away, as a result of which the evaluation of the data packets can present problems. The controller itself can neither detect nor appropriately correct the different propagation times of the data, since it has neither any information about the configuration of the processing units nor about the length of the data lines.

Parameters of this type may in practice be programmed only with a very great deal of effort, for example in an initialization routine. In addition, they would have to be adapted specifically for each computer type, since the individual computer systems differ in constructional terms. In addition, any subsequent expansions of the memory of the computer system would have to be matched appropriately to the problem by a specialist.

The procedure is made more difficult, if, between the controller and the processing unit, there are further units such as data buffers, which for example receive signals, addresses and data and have to allocate them specifically to the individual processing units.

In addition to the propagation time differences mentioned above, as a result of switching operations, for example in the data buffers, undesired switching times, latency times, as they are known, occur and are likewise disruptive, in particular in a fast computer system.

Solving these problems, for example by appropriate programming, is also made more difficult by the fact that the individual propagation times and the latencies depend on the system configuration and the speed class of the memories used and are therefore difficult to acquire.

In order to compensate for the above-described system-induced signal propagation times for the processing units or memory banks, programmable latency registers are used. The programmable latency registers can then be programmed in such a way that they transmit to the controller with a delay the read data from that memory bank which has the shortest data line to the controller. However, the solution cannot be applied if a data buffer is connected in the line between the processing unit and the controller. For the forward switching latencies which occur here and which occur during the selective forwarding of the signals by the data buffer, a solution has hitherto not been known.

German Patent DE 44 39 126 C1 discloses a buffer device in which, for the purpose of clock matching between an input and an output data signal, a first buffer memory is provided to buffer a call signal and a second buffer memory is provided to buffer the data called. By use of two address counters used jointly, the buffer memories are in this case controlled in such a way that the sum of their propagation times or clock cycles is the same.

Furthermore, German Patent DE 196 25 219 C1 discloses a device to compensate for signal propagation time differences in digital transmission devices having a higher-order point and a plurality of lower-order points, in which the signal propagation time in the transmission devices is measured automatically, propagation time differences are compensated for automatically and the useful signals at the respective lower-order points are automatically synchronized with one another.

SUMMARY OF THE INVENTION

It is accordingly an object of the invention to provide a method of matching different signal propagation times between a controller and at least two processing units, and a computer system which overcome the above-mentioned disadvantages of the prior art methods and devices of this general type, which make it possible to compensate in a simple way for the system-induced propagation time differences of read data.

With the foregoing and other objects in view there is provided, in accordance with the invention, a method of matching different signal propagation times between a controller and at least two processing units including a first processing unit and a second processing unit. The processing units are connected to the controller through data lines of different lengths. The method includes the steps of sending a read command to select one of the processing units for a read operation, and sending from the controller, a read signal through a separate line first to the second processing unit being furthest removed from the controller and then to the first processing unit being closer to the controller than the second processing unit in order to start the read operation. A sum of signal propagation times of the read signal from the controller to a selected processing unit and of read data from the selected processing unit to the controller is constant.

The method according to the invention of adapting different signal propagation times between the processing units and the controller and, respectively, the computer system according to the invention, have the advantage that, by using an additional read signal, the system-induced propagation time differences of read data can be compensated for in a simple way. It is seen as a particular advantage in this case that the match is independent of the physical distance between the individual processing units and the controller. The correction of the propagation time is achieved in the same way both in the processing unit which is disposed close to the controller and in the processing unit disposed further away with very long connecting lines to the controller. This is advantageously achieved with only little effort. The use of programmable latency registers is then no longer necessary.

As a result of using a separate line, the read signal can be supplied to the processing unit irrespective of the remaining data, control and address lines. The processing unit can then be addressed at any time and independently of the data flow on the aforementioned other lines. This simplifies the structure of the memory chips. In addition, additional units such as data buffers can advantageously be driven via the line.

In order to ensure that the read word has also been received by the processing unit, it is beneficial to transmit the read signal bi-directionally between the controller and the processing unit. For example, the read word can advantageously be sent back to the controller over the same line for the purpose of acknowledgement. As a result, additional command and address lines are advantageously saved.

Furthermore, it is advantageous for the processing unit to acknowledge the read signal and send it back to the controller. This results in a closed signal circuit for the read signal, so that its propagation time from the controller and back is always of the same length, irrespective of the position of the processing unit addressed. This also applies when corresponding data buffers are interposed between the controller and the processing units.

A further beneficial solution is also seen in the fact that the read signal is also used for the purpose of controlling the various operating modes of the data buffers. As a result, the necessary effort of switching for implementing a data buffer may be minimized and, at the same time, the flexibility in use can be increased.

A very simple solution for controlling the different propagation times of the data is also seen in the fact that the delay to the data transmission is carried out by an appropriate number of clock cycles, one clock cycle being judged to be the smallest time unit. The clock cycles are predefined, for example by the controller, and likewise pass via the control lines to the processing units, and, respectively, to the data buffers. In other words, the clock signals synchronize the controller, the data buffers and the processing units.

In order to switch the data, addresses or control commands through synchronously, a small wait time is provided between the emission of the read command and the emission of the read signal, for reasons of matching to the different characteristics of the subassemblies used. This wait time can be defined in such a way that it takes account of specific operating parameters.

For example, the wait time can advantageously take account of the different speed classes of memory modules. In the case of fast memory modules, it will be chosen to be shorter than in the case of slow modules. In this case, it is also necessary to take account of the fact that the aim should be the shortest possible wait time, in order to achieve the highest possible processing speed.

Furthermore, it is beneficial to define the wait time with a view of the existing system configurations, in order that no processing problems with the data can occur during subsequent operation.

The individual subassemblies, such as memory banks, data buffers with matrix and so on, because of their physical configuration with a large number of semiconductor switches, have the effect of additional delays in the signal propagation times. Such latency times, as they are known, may likewise be compensated for and taken into account in the matching. For example, the latency times in the direction of the controller and of the processing unit can be predefined by a suitable choice of the data buffers or else by suitable signal routing. Preferably the latency times are equal in length.

An advantageous solution is also seen in the fact that the processing unit delays the emission of the read data to the controller, for example by four clock cycles following the entry of the read signal. The time interval is long enough to switch over all the downstream subassemblies, in particular the data buffers with their latency times, to a further operating mode.

It is also beneficial if, two clock cycles before sending the read data, the data buffer sends a response signal to an adjacent data buffer which is closer to the controller. By the response signal, the data buffer advantageously detects, without great effort, the direction from which the read data comes. It therefore detects whether the read data will come directly from the associated memory bank or from a data buffer further to the right. On this basis, it changes to one of its operating modes. In the second case, the data buffer would switch to its operating mode 3, in order that the read data can reach the controller two clock cycles later.

The invention is based on the object, in the computer system, of matching propagation time differences of data signals between the controller and the plurality of processing units connected via lines.

In a concomitant feature of the invention, a data buffer is connected between each of the processing units and the controller, and in each case the data buffers have an operating mode controlled (selected) by the read signal.

Other features which are considered as characteristic for the invention are set forth in the appended claims.

Although the invention is illustrated and described herein as embodied in a method of matching different signal propagation times between a controller and at least two processing units, and a computer system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a block diagram of a signal flow in the exemplary embodiment following an emission of a read command and a read signal by a controller to the data buffer;

FIG. 6 is a block diagram of the signal flow in the exemplary embodiment from the processing unit after receipt of the read signal; and FIG. 7 is a block diagram of the signal flow in the exemplary embodiment after the data buffer has changed to the operating mode 3.

DESCRIPTION OF THE PREFERRED EMBODIMENTS

Figure 1:
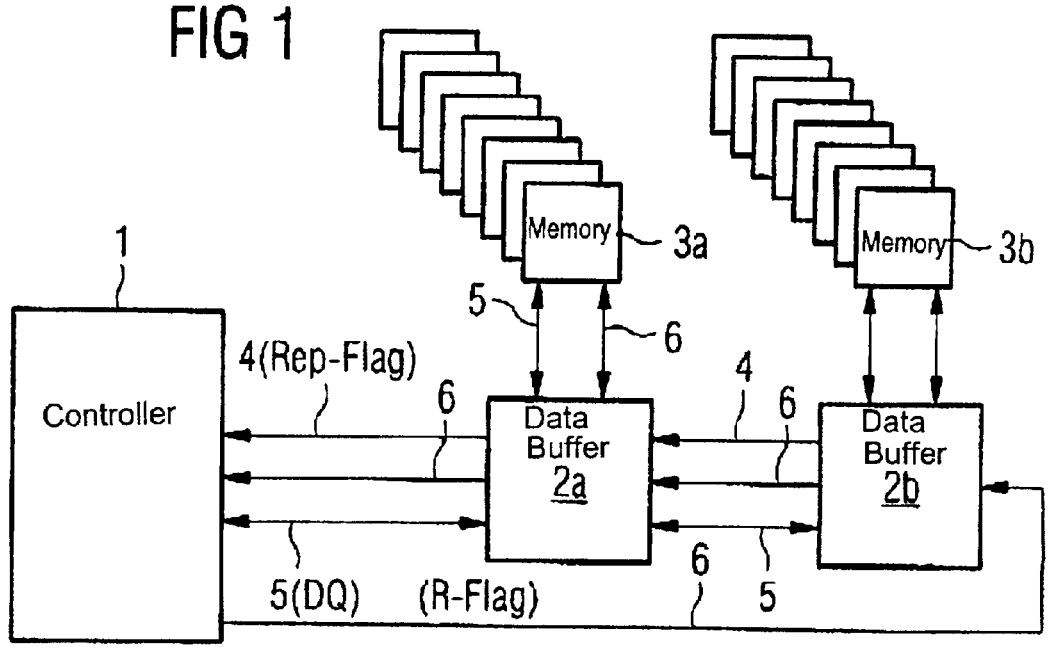
FIG. 1 is a block diagram of an exemplary embodiment according to the invention.

Referring now to the figures of the drawing in detail and first, particularly, to FIG. 1 thereof, there is shown a schematic block diagram of an extract of a controller 1 of a computer system, which is connected serially via data lines 5 to two downstream data buffers 2a and 2b. Furthermore, the data buffers 2a, 2b are also connected, likewise via the data line 5 in each case to a downstream processing unit 3a and, respectively, 3b. As an example, in the following text a memory bank is provided as the processing units 3a, 3b.

The configuration corresponds, for example, to a memory subsystem which has a controller known per se as the controller 1. The controller 1 is controlled by appropriate software (operating system) and contains all the units necessary for this purpose.

The two memory banks 3a, 3b are explained merely by way of example. They contain commercially available memory modules (memory chips) such as dynamic random access memories (DRAMs), which are provided with appropriate control logic for the storage organization and a bus system for the transmission of addresses, control commands and data. The storage capacities of the memory banks 3a, 3b are substantially dependent on the system configuration and the size of the memory chips used and have no influence on the basic application of the invention. The eight fields shown in the memory banks 3a, 3b are intended merely to signal the fact that the memory banks 3a, 3b have a sufficiently large capacity to be able to store the individual data words.

Of course, further memory banks can be provided in an alternative configuration of the invention and can then be connected to the controller 1 in a manner analogous to the above exemplary embodiment.

As FIG. 1 further reveals, because of the different spatial configuration of the memory banks 3a, 3b, the data lines 5 between the controller 1 and the individual memory banks 3a, 3b are configured with different lengths, which, necessitated physically, also leads to propagation times of different lengths of the data signals to the controller 1. The data interchange (DQ signals) between the controller 1 and the memory banks 3a, 3b is preferably carried out bi-directionally via the data lines 5. The data lines 5 have therefore been shown as a double arrow. It is also important that the data interchange always takes place via the interposed data buffers 2a, 2b.

Furthermore, lines 4 and 6 are shown in FIG. 1. The line 4 is a return line, via which a read flag response signal (repeater or Rep-Flag) is transmitted from the data buffer 2b located furthest away to the closer data buffer 2a and then onward in the direction of the controller 1. The repeater flag is produced by the data buffer 2a or 2b to whose associated memory bank 3a or 3b the currently processed read command is addressed. The corresponding memory bank 3a or 3b detects this automatically and acknowledges the associated read signal on the bi-directional read line. The associated data buffer 2a or 2b then initiates the repeater flag.

Via the separate line 6, a read signal (R-Flag) is forwarded first to the furthest removed data buffer 2b and then from there to the associated memory bank 3b and also to the closer data buffer 2a. The precise functions of the signals will be explained in more detail in a subsequent section. For the purpose of better understanding, it should be noted at this point that the data buffers 2a, 2b themselves cannot detect the memory bank 3a, 3b to which a command or flag refers. They cannot therefore decide "on which route" the flags are sent. only the memory banks 3a, 3b are capable of deciding whether a flag is relevant to them.

For reasons of clarity, the lines shown have been illustrated only schematically in the drawing. Therefore, lines for clock signals, the command and address bus have not been shown in detail either.

Figure 2:
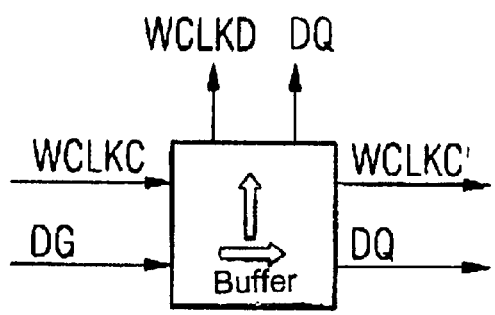
FIG. 2 is a block diagram of a data buffer in an operating mode 1.
Figure 3:
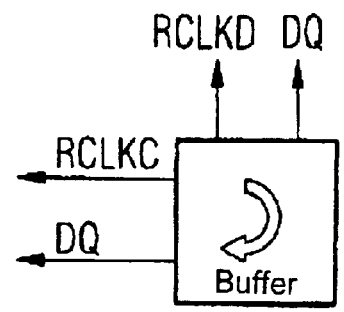
FIG. 3 is a block diagram of the data buffer in an operating mode 2.
Figure 4:
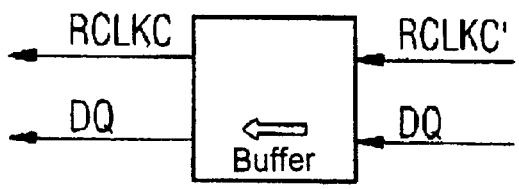
FIG. 4 is a block diagram of the data buffer in an operating mode 3.

The construction and the functioning of the data buffers 2a, 2b will be explained in more detail below in relation to FIGS. 2 to 4. FIGS. 2 to 4 show the data buffer 2a, 2b in a schematic representation, which is configured for three operating modes. The data buffer 2a, 2b substantially has, in addition to logic functions, a switching matrix, via which the data and signals can be forwarded in the various directions in the shortest possible time.

FIG. 2 shows, by way of example, the data buffer 2a in an operating mode 1. The data DQ arriving from the controller 1 via the data line 5 is forwarded both to the right to the next data buffer (2b in this example) and upward to the associated memory bank 3a. Here, the data is forwarded in the direction of the database 3a in synchronism with the clock signal WCLKC. The data forwarded in the direction 2b is synchronized with WCLKL'. The operating mode 1 is the standard mode. It is left only briefly when the operating modes 2 and 3 are needed. The data buffer then returns automatically to the standard mode (operating mode 1).

During the transmission procedures within the data buffers 2a, 2b, because of the physical characteristics of the switching transistors in the data buffers, delay times (switching times) or latencies occur which have a disruptive effect in the case of fast memory operations. In addition to the propagation time delays on the data lines 5, the latencies can advantageously also be matched or compensated for by the invention.

FIG. 3 shows the data buffer 2a, explained by way of example, in its operating mode 2. It forwards the data DQ coming from the memory bank 3a, for example to the controller 1. In the case of the data buffer 2b, the read data DQ would first be led to the data buffer 2a located further to the left. The read data DQ coming from the memory bank 3a, 3b is synchronized with the read signal RCLKD and then forwarded from the respective data buffer 2a, 2b to the controller 1 with the synchronization RCLKC.

In FIG. 4, the operating mode 3 is shown by way of example for the data buffer 2a. Here, the read data DQ which is sent by the data buffer 2b located further to the right is sent to the left, to a further data buffer 2a (if it is present) or to the 18 controller 1. The incoming data has been synchronized with the read signal RCLKC' and is forwarded with the synchronization RCLKC.

The data buffers 2a, 2b are constructed relatively simply. For example, they need no complicated logic circuits for decoding signals, since they previously receive control commands such as R-Flag, Rep-Flag, by which they are switched to the necessary operating modes. They can then forward the incoming data DQ (write or read data) appropriately. They then switch back automatically to the operating mode 1.

In a further refinement of the invention, provision is made for the functions of the data buffers 2a, 2b to be integrated into the memory banks 3a, 3b, so that the data buffers 2a, 2b are then a constituent part of the memory banks 3a, 3b.

FIGS. 5 to 7 explain how the propagation times of the data signals and the latencies of the memory units are matched in accordance with the invention. For better understanding, reference should be made to the fact that the individual units are largely identical with the representation in FIG. 1. Only the directional arrows for the signal flow differ in the individual steps.

In order to make the necessary changeover to the operating modes 2 and 3 of the data buffers 2a, 2b possible and in order to ensure an arrival time of the read data at the controller 1 which is independent of the position of the memory chips of the memory banks 3a, 3b in the computer system, at a predefined time interval (wait time) following the emission of the read command, the controller 1 sends a read signal (R-Flag) via the lower line 6 to the furthest removed data buffer, to the data buffer 2b in our example. The actual read command has previously been emitted via a command and address bus, which is not illustrated in FIG. 5 for reasons of clarity. The predefined wait time is preferably defined on the basis of operating parameters such as the system configuration, the speed class of the memory chips used, the clock frequency and so on.

The furthest removed data buffer 2b sends the read signal R-flag on to the associated memory chips of the memory bank, for example 3b. In addition, the read signal R-flag is sent via the lines 6 to the data buffer 2a, which distributes it to the associated memory chips of the memory bank 3a and onward in the direction of the controller 1.

The latency times for the data buffers 2a, 2b are preferably configured such that they are of the same size in the direction of the memory chips as in the direction of the controller 1, which can substantially be determined by the configuration of the switching matrix.

In an alternative configuration of the invention, provision is made, in the event of different latency times, for the latter to be entered into the controller 1 and taken into account.

If, then, the read signal R-Flag reaches the desired memory bank 3b, to which the read command had referred—in order to remain there in the above example—then the memory chips of the memory bank 3b will not send the desired data DQ immediately via the data line 5 but with a delay, for example of four clock cycles after the entry of the read signal R-Flag. The delay is necessary in order to circumvent the aforementioned problems of different propagation times, to minimize the latencies and to prepare the data buffers 2a, 2b for the changeover.

Memory chips of the memory bank 3a not addressed or any further memory banks present ignore the read signal R-Flag, so that no reaction emanates from them. The critical factor here is that the total latency time between the read command and the emission of data at the corresponding memory bank necessitated by the configuration of the DRAM, is not increased by the introduction of the read signal R-Flag and the control by the repeater flag. As a result, the performance of the system is even improved further in an advantageous way, because of the more efficient use of the data bus.

The read signal R-Flag on the line 6 runs topologically to the controller 1 on the data lines 5, as does the data read out. Provision is made for the line 6 to run substantially parallel to the data lines, so that the line lengths and therefore the signal propagation times are virtually equal.

Furthermore, the sum of the two propagation times which is formed by the read signal as it passes from the controller 1 to the memory chips of a selected memory bank and also by the propagation time of the data read out, which runs from the memory chips to the controller 1, is always constant, as can be seen from the signal propagation in FIG. 5. This results in the delay time and therefore the 'arrival time' of the read data in the controller 1 being independent of the position of the memory bank 3a, 3b addressed. As a result, line-induced differences in the signal propagation times are compensated for automatically.

After the read signal R-Flag has entered the memory bank 3b, FIG. 6 then shows, in a next step, the further signal propagation of the read data and of the read signal. It will be assumed again that the memory bank 3b had received the read signal.

Before the relevant memory chips of the memory bank 3b send out the desired read data, these respond, for example two clock cycles before sending out the read data on the bi-directional line 6, with a response signal (read flag response signal) which is evaluated by the associated data buffer 2b. When the read flag response signal is received, the action of switching the data buffer 2b to the operating mode 2 after two further clock cycles is prepared. As a result, the latency time of the data buffer 2b is advantageously minimized. The actual read data can then be forwarded in the direction of the controller 1 in the appropriate time window (after two clock cycles).

Furthermore, the data buffer 2b uses the read flag response signal to form a repeater flag (Rep-Flag) as it is known and forwards this in the direction of the controller 1, via the control line 4, to the data buffer 2a disposed further to the left. In order to configure the data buffer 2a, 2b as simply as possible and, for example, to save logic circuits for decoding addresses, the repeater flag is advantageously produced, by which a definition is made as to whether the data comes from a data buffer lying further to the right or directly from the associated memory bank. In addition, the repeater flag leads the actual read data by two clock cycles.

In an alternative configuration of the invention, it is also possible to provide for the repeater flag to run in the direction of the controller 1 on the data lines 5.

FIG. 7 shows the last step in the signal flow, after the repeater flag has been transmitted to the data buffer 2a located further to the left. After receiving the repeater flag from the data buffer 2b, the data buffer 2a prepares to change to an operating mode 3. This is identified in FIG. 7 by the fact that the data line 5 between the data buffer 2a and the controller 1, as opposed to the illustration in FIG. 1, is formed as a single arrow whose point points toward the controller 1. As a result of the changeover, it is then possible for the actual read data to be switched through to the controller 1, for example two clock cycles after receipt of the repeater flag.

As a result of the aforementioned preparation phase, the switching times (latencies) of the data buffers 2a, 2b can advantageously no longer exert any disruptive influence so that the read data is switched through with minimal latency times.

In summary, the result is that the invention has eliminated three significant problems that, in their previous form could overall only be solved inadequately. First, by the introduction of the additional read signal R-Flag which is preferably routed via the separate line 6 to the furthest removed data buffer 2b and via the other data buffers 2a disposed in the circuit back to the controller 1, propagation time and latency differences for accesses to different memory banks 3a, 3b are compensated for.

Second, by the delayed transmission of the desired data DQ with the aid of the read signal R-Flag and of the repeater flag, the latency times arising in the data buffers 2a, 2b are minimized, and the functionality in the data buffers 2a, 2b is controlled, and third, as a result of the introduction of the wait time between the emission of the read command and the emission of the read signal by the controller 1, a simple possible way of matching various system parameters, such as the speed class of the memory modules used, the system configuration and so on, is achieved in an advantageous way. Complicated individual measures to this end are not required.

I claim:

1. A method of matching different signal propagation times between a controller and at least two processing units including a first processing unit and a second processing unit, the processing units being connected to the controller through data lines of different lengths, which comprises the steps of:

sending a read command to a select one of the processing units for a read operation;

sending from the controller, a read signal through a separate line first to the second processing unit being furthest removed from the controller and then to the first processing unit being closer to the controller than the second processing unit in order to start the read operation, a sum of signal propagation times of the read signal from the controller to a selected processing unit and of read data from the selected processing unit to the controller being constant; and using the read signal to control an operating mode of data buffers, each of the data buffers is connected between the controller and one of the processing units.

2. The method according to claim 1, which comprises:

transmitting the read signal bi-directionally; and using memory banks as the processing units.

3. The method according to claim 1, which comprises the selected processing unit acknowledging the read signal.

4. The method according to claim 1, which comprises using clock signals to synchronize the controller, the data buffers and the processing units.

5. The method according to claim 1, which comprises configuring the data buffers such that a first delay time in a direction of the controller and a second delay time in a direction of the processing units is predefined.

6. The method according to claim 5, which comprises setting the first delay time to be equal to the second delay time.

7. The method according to claim 1, which comprises forwarding the read data in a direction of the controller from the selected processing unit after four clock cycles after an entry of the read signal.

8. The method according to claim 7, which comprises evaluating, in a first data buffer of the data buffers, a reply from the selected processing unit and, two clock cycles before forwarding the read data, the first data buffer sends a response signal to a second data buffer of the data buffers which is closer to the controller.

9. The method according to claim 8, which comprises following the evaluation of the response from the selected processing unit, the first data buffer changes to a second operating mode.

10. The method according to claim 8, which comprises after receiving the response signal, the second data buffer disposed closer to the controller changes to a third operating mode, to transmit the read data to the controller after two further clock cycles.

11. The method according to claim 1, which comprises sending the read signal, from the controller, after a predefined wait time following emission of the read command.

12. The method according to claim 11, which comprises choosing the predefined wait time between a transmission of the read command and a transmission of the read signal in dependence on a speed class of the processing units.

13. The method according to claim 11, which comprises choosing the predefined wait time in dependence on a system configuration.

14. A computer system, comprising:

data lines having different lengths;

at least two processing units including a first processing unit and a second processing unit;

a controller connected to said processing units through said data lines, said controller sending a read signal first to said second processing unit being furthest removed from said controller and then to said first processing unit being closer to said controller than said second processing unit;

a separate line connected between said controller and said processing units for transmitting the read signal; and data buffers, and one of said data buffers connected between each of said processing units and said controller, and in each case said data buffers have an operating mode controlled by the read signal;

said controller and said data processors programmed such that a sum of signal propagation times of the read signal from said controller to a selected one of said processing units and of read data from said selected one of said processing units to said controller being constant.

15. The computer system according to claim 14, wherein said separate line transmits the read signal bi-directionally.

16. The computer system according to claim 14, wherein said data buffers are configured such that a first delay time in a direction of said controller and a second delay time in a direction of said processing units is predefined.

17. The computer system according to claim 16, wherein the first delay time and the second delay time are equal.

18. The computer system according to claim 14, wherein said processing units are memory banks.

* * * * *